United States Patent
Kwon

(10) Patent No.: US 9,491,013 B2
(45) Date of Patent: Nov. 8, 2016

(54) DEVICE AND METHOD FOR REMOVING DIRECT CURRENT OFFSET USING RANDOMIZED CONTROL PULSE

(71) Applicant: Samsung Electronics Co., Ltd., Suwon-si, Gyeonggi-do (KR)

(72) Inventor: Ku-Duck Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/356,057

(22) PCT Filed: Nov. 6, 2012

(86) PCT No.: PCT/KR2012/009269
§ 371 (c)(1),
(2) Date: May 2, 2014

(87) PCT Pub. No.: WO2013/069943
PCT Pub. Date: May 16, 2013

(65) Prior Publication Data
US 2014/0286456 A1    Sep. 25, 2014

(30) Foreign Application Priority Data
Nov. 7, 2011 (KR) .......................... 10-2011-0115228

(51) Int. Cl.
*H04B 1/30* (2006.01)
*H04L 25/06* (2006.01)
*H04B 1/00* (2006.01)

(52) U.S. Cl.
CPC ............... *H04L 25/063* (2013.01); *H04B 1/30* (2013.01); *H04B 1/0028* (2013.01)

(58) Field of Classification Search
CPC .................................. H04B 1/00; H03L 5/00
USPC .......................................................... 375/319
See application file for complete search history.

(56) References Cited

U.S. PATENT DOCUMENTS

| | | | |
|---|---|---|---|
| 6,509,777 B2 * | 1/2003 | Razavi et al. | 327/307 |
| 7,403,760 B1 * | 7/2008 | Gao | 455/312 |
| 7,969,222 B2 * | 6/2011 | Bouras | 327/307 |
| 2005/0110550 A1 * | 5/2005 | Shi | H03D 3/008 327/307 |
| 2005/0195024 A1 * | 9/2005 | Cheng | 330/9 |
| 2005/0258989 A1 * | 11/2005 | Li et al. | 341/120 |
| 2007/0063757 A1 * | 3/2007 | Bouras | 327/307 |
| 2008/0075301 A1 * | 3/2008 | Watanabe | 381/94.5 |
| 2011/0051850 A1 * | 3/2011 | Cha et al. | 375/319 |

FOREIGN PATENT DOCUMENTS

| | | |
|---|---|---|
| KR | 10-2001-0034820 A | 4/2001 |
| KR | 10-2005-0063893 A | 6/2005 |
| KR | 10-2006-0064567 A | 6/2006 |
| KR | 10-2007-0007889 A | 1/2007 |

* cited by examiner

*Primary Examiner* — Jaison Joseph
(74) *Attorney, Agent, or Firm* — Jefferson IP Law, LLP

(57) ABSTRACT

A device and method for solving problems of the prior art in which channel information as well as a DC offset is removed when removing the DC offset using a feedback signal of a baseband amplifier is provided. The device includes a DC offset correcting unit for removing the DC offset using an HPF function and controlling a feedback path according to a control signal to stop the HPF function and a signal generator for generating the control signal for controlling the HPF function, wherein the control signal is a signal for controlling formation and cutting-off of the feedback path.

12 Claims, 5 Drawing Sheets

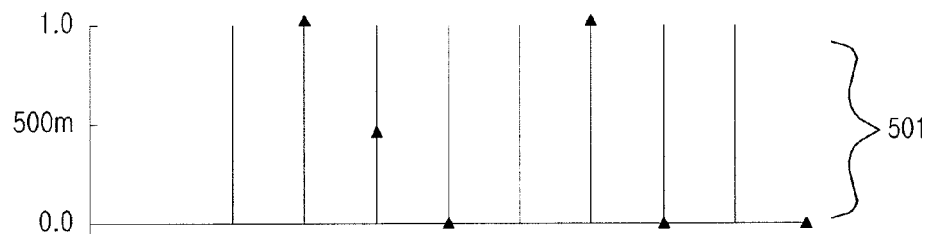
FIG.5A
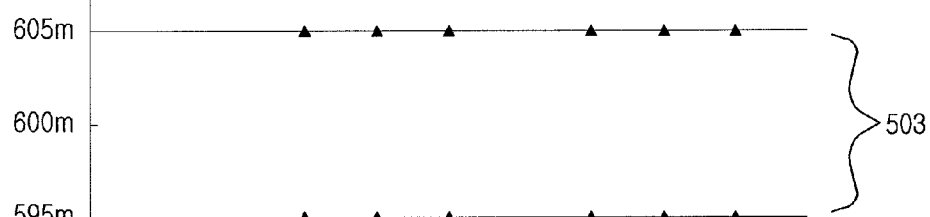
FIG.5B
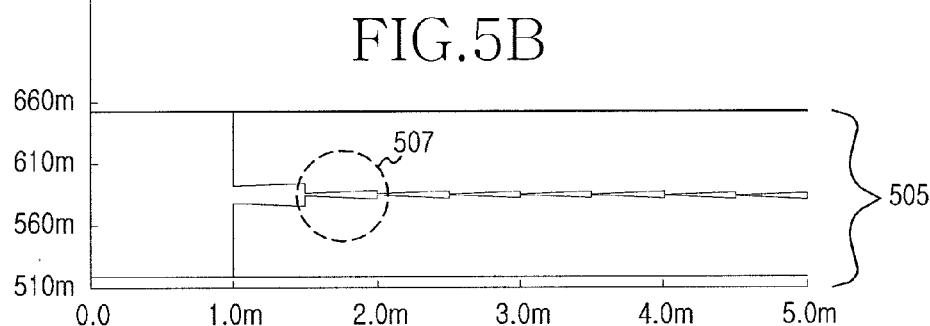
FIG.5C
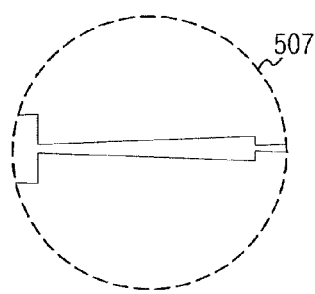

DEVICE AND METHOD FOR REMOVING DIRECT CURRENT OFFSET USING RANDOMIZED CONTROL PULSE

BACKGROUND OF THE INVENTION

1. Field of the Invention

The present invention relates to a Direct Current (DC) offset correcting unit of a direct conversion receiver. More particularly, the present invention relates to a device and method for solving problems of the prior art in which channel information as well as a DC offset is removed when removing the DC offset using a feedback signal of a baseband amplifier.

2. Description of the Related Art

Each of most wireless communication transceivers selects and uses an analog heterodyne receiving method of down-converting a signal received therein into a baseband or low Intermediate Frequency (IF) through several mixers and IF terminals. However, there are problems in that a conventional transmission and reception structure using a plurality of analog components is complicated in its circuit and is difficult to be integrated as one chip. Therefore, there is a problem in that a transceiver using the transmission and reception structure is increased in volume.

In order to solve these problems, there is a direct conversion receiver composed of a Radio Frequency Integrated Circuit (RFIC). This structure composed of the RFIC will come into general use in a transceiver of a miniaturized and low-power system in the future. Because this direct conversion receiver performs only one frequency up and down conversion using one mixer, various filters, amplifiers, and peripheral circuits which must be used whenever one mixer is used may be reduced. Therefore, a system is simplified by minimizing an RF parts. This results in one-chip possibility of being increased. Finally, there is an advantage in that a unit cost may be reduced.

However, the direct conversion receiver generates many problems in its function. For example, a role burden to the mixer as well as an oscillation problem, a selectivity problem, etc. is increased. Particularly, the direction conversion receiver leads to a DC offset problem by leakage in a frequency of a local oscillator and a fatal problem such as noises generated near a DC band, etc.

In general, a DC offset may be easily removed by a DC-blocking capacitor. However, there is a problem in that it is required to provide a capacitor of a huge size to remove the DC offset in a baseband frequency band.

For this reason, there is a method of removing the DC offset by forming feedback by connecting a Low Pass Filter (LPF) or an integrator to a block which removes the DC offset.

As described above, because a High Pass Filter (HPF) function is generated in a closed-loop circuit forming the feedback, there is a principle in which the DC offset is removed by the HPF function. That is, if feedback is formed by connecting an LPF having a characteristic of $\beta(s)$ to an amplifier having a frequency characteristic of $A(s)$, a frequency characteristic $Avf(s)$ of the entire closed-loop is approximated as a smaller value of $1/\beta(s)$ and $A(s)$ in the Bode's diagram on a feedback characteristic and a HPF characteristic is implemented. Therefore, the DC offset is removed by the filtering by the HPF characteristic.

The DC offset may be removed by the above-described method. However, because not only the DC offset but also channel information in a low-frequency band is removed by the HPF characteristic, there is a problem in that an Error-Vector-Magnitude (EVM) or Signal-to-Noise Ratio (SNR) of a receiving terminal is degraded.

In order to solve the above-described problem, the loss of the EVM may be reduced by reducing a cutoff frequency of the direct conversion receiver to less than 1 to 10 KHz. In this case, because time of when the closed-loop is settled is lengthened, when a generated DC offset is changed, according to a channel environment, there is a problem in that to remove the DC offset keeps up with speed at which the channel environment is changed.

Therefore, it is required to provide a device and method for removing the DC offset in the direct conversion receiver to solve the above-described problems.

SUMMARY OF THE INVENTION

An aspect of the present invention is to solve at least the above-mentioned problems and/or disadvantages and to provide at least the advantages described below.

Accordingly, an aspect of the present invention is to provide a device and method for improving a DC offset removal function in a direct conversion receiver.

Another aspect of the present invention is to provide a device and method for controlling formation of a feedback path for removing a DC offset in a direct conversion receiver.

Another aspect of the present invention is to provide a device and method for controlling formation of a feedback path using a random pulse in a direct conversion receiver.

In accordance with an aspect of the present invention, a device for removing a DC offset in a direct conversion receiver is provided. The device includes a DC offset correcting unit for removing the DC offset using an HPF function and controlling a feedback path according to a control signal to stop the HPF function and a signal generator for generating the control signal for controlling the HPF function, wherein the control signal is a signal for controlling formation and cutting-off of the feedback path.

In accordance with an aspect of the present invention, a method of removing a DC offset in a direct conversion receiver is provided. The method includes forming a feedback path and sensing the DC offset, removing the DC offset using an HPF function when sensing the DC offset, and controlling the feedback path according to a control signal to stop the HPF function, wherein, the control signal is a signal for controlling formation and cutting-off of the feedback path.

In accordance with another aspect of the present invention, a DC offset correcting unit of a direct conversion receiver is provided. The DC offset correcting unit includes an integrator, a voltage-to-current converter for adjusting current for removing a DC offset using an output voltage of the integrator, a first switch for controlling a DC offset feedback path between a baseband amplifier and the integrator, and a signal generator for generating a control signal for controlling an operation of the first switch.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIGS. 5A to 5C are waveform charts illustrating a change amount of a DC offset according to an operation of a DC offset correcting unit according to one embodiment of the present invention.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

Hereinafter, a description will be given for a device and method for repeatedly forming and cutting-off a feedback path for removing a DC offset using a random pulse and improving DC offset removal performance in a direct conversion receiver.

Figure 1:
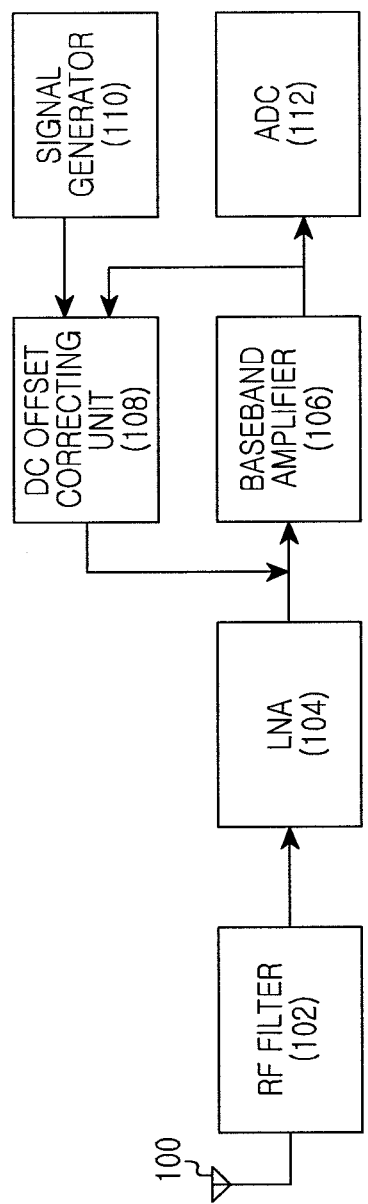
FIG. 1 is a block diagram illustrating configuration of a receiving device for removing a DC offset according to one embodiment of the present invention.

FIG. 1 is a block diagram illustrating configuration of a receiving device for removing a DC offset according to one embodiment of the present invention.

Referring to FIG. 1, the receiving device may include an antenna 100, an RF filter 102, a Low Noise Amplifier (LNA) 104, a baseband amplifier 106, a DC offset correcting unit 108, a signal generator 110, and an Analog to Digital Converter (ADC).

First of all, a noise of an RF signal received through the antenna 100 is removed by being filtered through the RF filter 102. The RF signal whose noise is removed is low-noise amplified through the LNA 102 and the low-noise amplified RF signal is converted into a baseband signal. At this time, the converted baseband signal is amplified by the baseband amplifier 106 and the amplified signal is input to the ADC 112.

Herein, because a DC offset is generated in the process of converting the RF signal into the baseband signal, a signal in which quality of the receiving signal is degraded is input to the baseband amplifier 106.

Therefore, the DC offset correcting unit 108 feeds an output signal of the baseband amplifier 106 back to the baseband amplifier 106. That is, the DC offset correcting unit 108 detects the DC offset included in the output signal of the baseband amplifier 106, generates a compensate voltage corresponding to the DC offset, and supplies the compensation voltage to the baseband amplifier 106 to remove the DC offset from the output signal of the baseband amplifier 106.

In general, a conventional DC offset correcting unit filters a DC offset through a HPF function provided from a closed-loop circuit. However, because channel information included in an input signal as well as the DC offset is removed, there is a problem in that a settling time is lengthened according to a change in DC voltage.

In order to solve the above-described problem, the DC offset correcting unit 108 according to one embodiment of the present invention controls formation of a closed-loop circuit (feedback path) using switching and prevents channel information as well as a DC offset from being removed. That is, if a DC offset is removed through an HPF function, the DC offset correcting unit 108 cuts off the closed-loop circuit to stop the HPF function. For this reason, an input signal whose DC offset is removed is amplified through the baseband amplifier 106. However, the DC offset will be generated as time goes on.

Thereafter, the DC offset correcting unit 108 forms a closed-loop circuit in a time point of when the DC offset is generated to execute the HPF function.

That is, the DC offset correcting unit 108 may perform a switching process of forming and cutting-off a closed-loop circuit using a signal generated by the signal generator 110. The signal generator 110 may generate a control signal for controlling the closed-loop circuit periodically. Because noises may be generated due to the periodical generation of the control signal, the signal generator 110 generates the control signal using a random pulse. In addition, the signal generator 110 may be configured to be included in the DC offset correcting unit 108.

Figure 2:
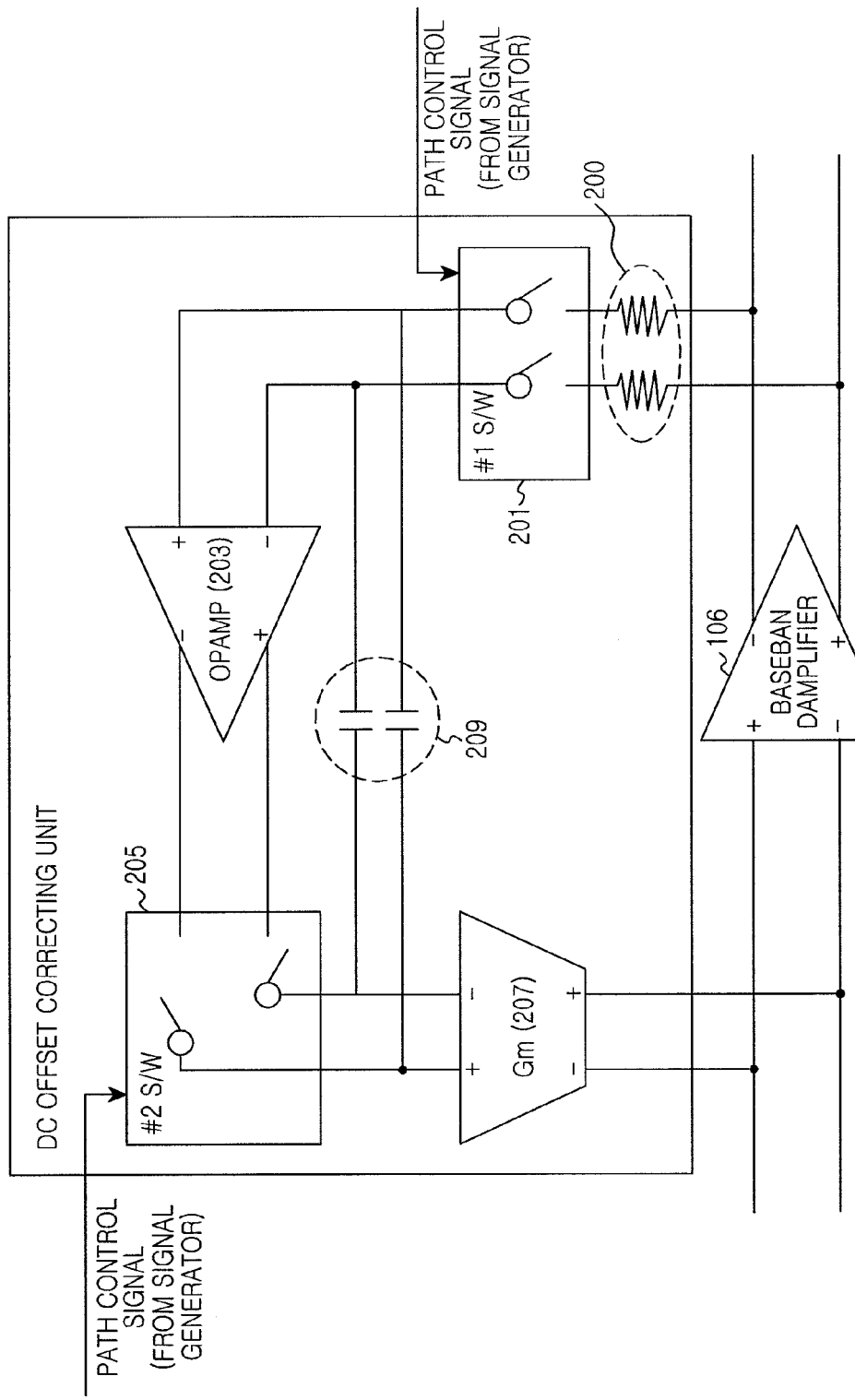
FIG. 2 is a circuit diagram illustrating detailed configuration of a DC offset correcting unit according to one embodiment of the present invention.

FIG. 2 is a circuit diagram illustrating detailed configuration of a DC offset correcting unit according to one embodiment of the present invention.

Referring to FIGS. 1 and 2, the DC offset correcting unit 108 may include an integrator including an Operational Amplifier (OP AMP) 203, a capacitor 209, and a resistor 200, a voltage-to-current converter 207, a first switch 201 for controlling a path between the baseband amplifier 106 and the integrator, and a second switch 205 for controlling a path between the integrator and the voltage-to-current converter 207.

The integrator of the DC offset correcting unit 108 provides a DC offset detected through the baseband amplifier 106 to the voltage-to-current converter 207. The voltage-to-current converter 207 removes the DC offset of a signal provided to the baseband amplifier 106 by adjusting current.

Herein, the DC offset correcting unit 108 provides an HPF function by being equipped with a closed-loop circuit.

That is, if feedback is formed by connecting a circuit or integrator having an LPF characteristic like β(s) to an amplifier having a frequency characteristic of A(s), a frequency characteristic Avf(s) of the entire closed-loop is approximated as a smaller value of 1/β(s) and A(s) in the Bode's diagram on a feedback characteristic and an HPF characteristic is implemented. Therefore, the DC offset is removed by the filtering due to the HPF characteristic.

As described above, the DC offset may be removed using the DC offset correcting unit 108. However, there is a problem in that an HPF removes channel information in a low frequency band as well as the DC offset.

In order to prevent the above-described problem from being generated, the DC offset correcting unit 108 according to one embodiment of the present invention cuts off a closed-loop circuit (forms an open-loop circuit) during a certain time and prevents the problem in which the channel information is removed.

That is, if the DC offset is removed though the HPF function, the DC offset correcting unit 108 cuts off the closed-loop circuit using the first switch 201 and the second switch 205 to stop the HPF function.

If the closed-loop circuit is cut off, the capacitor 209 supplies voltage for compensating the DC offset to the current-to-voltage converter 207 through a feedback path. For this reason, the DC offset correcting unit 108 may remove the DC offset in a state where it forms an open-closed circuit.

However, because charges of the capacitor 209 are discharged as time goes on in the state where DC offset correcting unit 108 forms the open-closed circuit, if a certain time passes, the DC offset will be increased.

For this reason, the DC offset correcting unit 108 switches the open-loop circuit to the closed-loop circuit using the first switch 201 and the second switch 205 to execute the HPF function.

Herein, the capacitor 209 whose charges are discharged charges its charges through the closed-loop circuit. As described above, the DC offset correcting unit 108 forms the closed-loop circuit and the open-loop circuit repeatedly to remove the DC offset.

The first switch 201 may be a switch for controlling execution of the

HPF function. The second switch 205 may be a switch for cutting off a path for discharging charges charged in the capacitor 209.

Herein, after forming the closed-loop circuit for removing the DC offset during a short time (before channel information is removed), the DC offset correcting unit 108 may form the open-loop circuit. As described above, time of when the closed-loop circuit is formed again from the open-loop circuit may be before charges of the capacitor 209 are discharged.

Therefore, because the first and second switches 201 and 205 for controlling formation of the closed-loop circuit and the open-loop circuit may operate according an amount of charges charged in the capacitor 209, a circuit for ascertaining the amount of charges charged in the capacitor 209 may be added in the DC offset correcting unit 108. However, in this case, because the circuit for ascertaining the amount of charges charged in the capacitor 209 is added in the DC offset correcting unit 108, the DC offset correcting unit 108 may be complicated in constitution.

Therefore, the DC offset correcting unit 108 may generate a control signal for controlling formation of the closed-loop circuit and the open-loop circuit at intervals of a certain time and operate the first and second switches 201 and 205. However, in this case, because there is a control signal in a channel band periodically, there is a problem in that the control signal may be recognized as a noise.

For this reason, the DC offset correcting unit 108 according to one embodiment of the present invention may use a random pulse as a control signal for controlling operations of the first and second switches 201 and 205.

Figure 3:
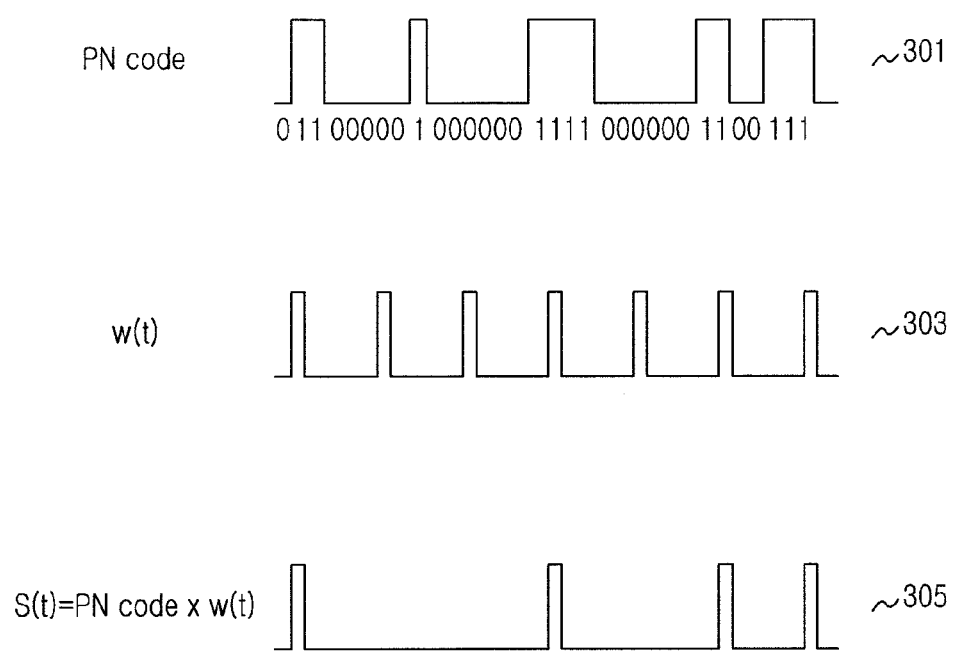
FIG. 3 is a waveform chart illustrating control signals for controlling switches of a DC offset correcting unit according to one embodiment of the present invention.

That is, as shown in FIG. 3, the problem in which a control signal s(t) 305 is recognized as a noise by generating the control signal s(t) 305 by multiplying a periodic signal w(t) 303 by a PN code 301

Figure 4:
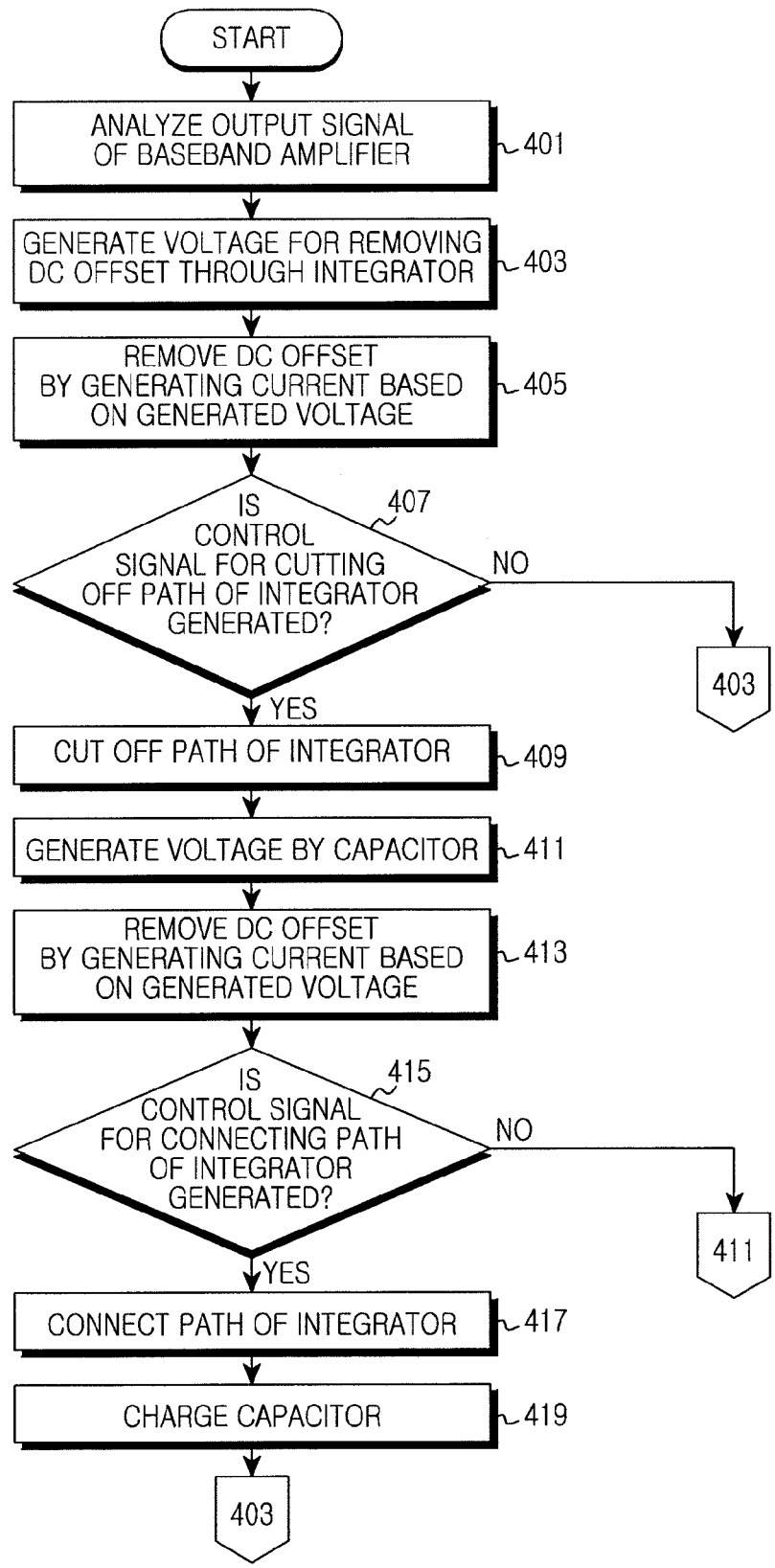
FIG. 4 is a flowchart illustrating a process of removing a DC offset in a DC offset correcting unit according to one embodiment of the present invention.

FIG. 4 is a flowchart illustrating a process of removing a DC offset in a DC offset correcting unit according to one embodiment of the present invention.

Referring to FIG. 4, the DC offset correcting unit includes an integrator including an OP AMP, a capacitor, and a resistor, a voltage-to-current converter, a first switch for controlling a path between a baseband amplifier and the integrator, and a second switch for controlling a path between the integrator and the voltage-to-current converter. The integrator provides an HPF function by being equipped with a closed-loop circuit.

In order to remove a DC offset, first of all, the DC offset correcting unit analyzes an output signal of the baseband amplifier in step 401. The DC offset correcting unit proceeds to step 403 and generates voltage for removing the DC offset through the integrator.

Herein, the DC offset correcting unit proceeds to step 405 and removes the DC offset based on the voltage generated from the integrator. Herein, the voltage generated from the integrator is supplied to the voltage-to-current converter. The voltage-to-current converter may remove the DC offset by adjusting current based on the supplied voltage.

Thereafter, the DC offset correcting unit proceeds to step 407 and verifies whether a control signal for cutting off a path of the integrator is generated. Herein, the control signal means a signal for cutting off the closed-loop circuit of the DC offset correcting unit (for forming an open-loop circuit). Herein, the control signal for cutting of the path of the integrator may be generated before channel information is removed by the integrator which provides the HPF function by being equipped with the closed-loop circuit.

If it is verified that the control signal for cutting off the path of the integrator is not generated in step 407, the DC offset correcting unit proceeds to step 403 and removes the DC offset in a state where it forms the closed-loop circuit. Herein, the state where it forms the closed-loop circuit means conditions in which the HPF function is provided.

On the other hand, if it is verified that the control signal for cutting off the path of the integrator is generated in step 407, the DC offset correcting unit proceeds to step 409 and cuts off a path to the integrator to form an open-loop circuit. Herein, conditions in which the open-loop circuit is formed mean conditions in which the HPF function is not provided.

As the open-loop circuit is formed, the generation of the voltage for removing the DC offset will be stopped.

For this reason, the DC offset correcting unit proceeds to step 411 generates voltage for compensating the DC offset using charges charged in the capacitor to provide the generated voltage to the voltage-to-current converter through the feedback path.

Thereafter, the DC offset correcting unit proceeds to step 413 and removes the DC offset by generating current based on the voltage generated from the capacitor. The DC offset correcting unit proceeds to step 415 and verifies whether a control signal for connecting the path of the integrator is generated. Herein, the control signal means a signal for forming the closed-loop circuit of the DC offset correcting unit. The control signal may be generated before the capacitor is discharged.

If it is verified that the control signal for connecting the path of the integrator is not generated in step 415, the DC offset correcting unit proceeds to step 411 and removes the DC offset in a state where it forms the open-loop circuit.

On the other hand, if it is verified that the control signal for connecting the path of the integrator is generated in step 415, the DC offset correcting unit proceeds to step 417 and connect the path of the integrator to switch the open-loop circuit to the closed-loop circuit.

Thereafter, the DC offset correcting unit proceeds to step 419 and charges the discharged capacitor. And, the DC offset correcting unit proceeds to step 403 and removes the DC offset in a state where it forms the closed-loop circuit.

FIGS. 5A to 5C are waveform charts illustrating a change amount of a DC offset according to an operation of a DC offset correcting unit according to one embodiment of the present invention.

First of all, in accordance with one embodiment of the present invention, a change amount of a DC offset 503 of when the DC offset 503 shown in FIG. 5B is input as 10 mV to an input end of a baseband amplifier is measured. It is assumed that a control signal s(t) 501 for controlling a switch of the DC offset correcting unit is generated, as shown in FIG. 5A, at intervals of 5 us for 500 us.

In an interval in which an initial closed-loop is formed, an input DC offset of 10 mV is amplified by 13 which is a gain of the baseband amplifier and a DC offset of 130 mV is generated in an output end of the baseband amplifier.

If a closed-loop circuit is formed by the control signal s(t) 501, it may be seen that an output DC offset of the baseband amplifier is reduced by removing the DC offset. However, if the closed-loop circuit is continuously connected, the DC offset is continuously filtered. However, there is a problem in that channel information included in an input signal as well as the DC offset is removed and a settling time is lengthened according to a change in DC voltage.

Therefore, the DC offset correcting unit according to one embodiment of the present invention may remove the DC offset without the problem of the prior art by forming the closed-loop circuit in only a moment using the control signal s(t) and forming the open-loop circuit in most of time (see a reference number 505).

Seeing a change amount of the DC offset in conditions in which the open-loop circuit is formed, it may be verified that the DC offset is more increased as time goes on (see a reference number 507). This is because the integrator of the DC offset correcting unit generates voltage for removing the DC offset when the closed-loop circuit is formed or the capacitor of the DC offset correcting unit generators voltage for removing the DC offset when the open-loop circuit is formed. Therefore, because an amount of charges charged in the capacitor is reduced as time goes on, the DC offset is increased.

In order to solve the above-described problems, the DC offset correcting unit according to one embodiment of the present invention forms, as shown in FIG. 5C, the open-loop circuit and the closed-loop circuit alternately according to the control signal s(t) 501.

As described above, the DC offset correcting unit according to one embodiment of the present invention may solve the problems of the prior art, in which the channel information as well as the DC offset is removed, using the HPF function by forming the open-loop circuit and the closed-loop circuit alternately with respect to the feedback path for removing the DC offset.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for removing a direct current (DC) offset in a direct conversion receiver, the method comprises:
   if a switch is on, determining an offset of an input signal by using a first voltage;
   if the switch is off, determining the offset of the input signal by using a second voltage; and
   generating an output signal by adjusting a current corresponding to the determined offset,
   wherein the first voltage is generated by using a feedback path operating as a high pass filter (HPF) through a capacitor of the HPF,
   wherein the feedback path is disconnected in response to the switch being off,
   wherein the second voltage is generated by using the capacitor, and
   wherein the capacitor is charged by the feedback path if the switch is on, and is discharged if the switch is off.

2. The method of claim 1, further comprises:
   generating, by a signal generator, a control signal by using a random pulse,
   wherein the switch are turned on or off repeatedly at random according to the control signal.

3. The method of claim 1, wherein the capacitor is connected an operation amplifier (OP-AMP) of the HPF.

4. A device for removing a direct current (DC) offset in a direct conversion receiver, the device comprises:
   a DC offset correcting unit; and
   a baseband amplifier,
   wherein the DC offset correcting unit is configured to:
   if a switch is on, determine an offset of an input signal by using a first voltage, and
   if the switch is off, determine the offset of the input signal by using a second voltage,
   wherein the baseband amplifier is configured to generate an output signal by adjusting a current corresponding to the determined offset,
   wherein the first voltage is generated by using a feedback path operating as a high pass filter (HPF) through a capacitor of the HPF,
   wherein the feedback path is disconnected in response to the switch being off,
   wherein the second voltage is generated by using the capacitor, and
   wherein the capacitor is charged by the feedback path if the switch is on, and is discharged if the switch is off.

5. The device of claim 4, further comprises:
   a signal generator configured to generate a control signal by using a random pulse,
   wherein the switch are tuned on or off repeatedly at random according to the control signal.

6. The device of claim 5, wherein the capacitor is connected an operation amplifier (OP-AMP) of the HPF.

7. A device for removing a direct current (DC) offset in a direct conversion receiver, the device comprises:
   a switch;
   a resistor;
   a capacitor;
   an operational amplifier (OP-AMP);
   a voltage-to-current converter; and
   a baseband amplifier,
   wherein the voltage-to-current converter is configured to:
   determine an offset of an input signal by using a first voltage if the switch is on, and
   determine the offset of the input signal by using a second voltage if a switch is off,
   wherein the baseband amplifier is configured to generate an output signal by adjusting a current corresponding to the determined offset,
   wherein the first voltage is generated by using a feedback path operating as a high pass filter (HPF), the HPF comprising the OP-AMP, the resistor and the capacitor,
   wherein the feedback path is disconnected in response to the switch being off,
   wherein the second voltage is generated by using the capacitor, and
   wherein the capacitor is charged by the feedback path if the switch is on, and is discharged if the switch is off.

8. The device of claim 7, further comprises:
   a signal generator configured to generate a control signal by using a random pulse,
   wherein the switch are tuned on or off repeatedly at random according to the control signal.

9. The device of claim 8, wherein the capacitor is connected the OP-AMP of the HPF.

10. The method of claim 1, wherein if the switch is on, the switch couples an input of an operation amplifier (OP-AMP)

in the direct conversion receiver with an output of an baseband amplifier to operate as the high pass filter.

11. The device of claim 4, wherein if the switch is on, the switch couples an input of an operation amplifier (OP-AMP) in the DC offset correcting unit with an output of the baseband amplifier to operate as the high pass filter.

12. The method of claim 7, wherein if the switch is on, the switch couples an input of the OP-AMP with an output of the baseband amplifier to operate as the high pass filter.

* * * * *